No. 837,496. PATENTED DEC. 4, 1906.
J. H. OSBORNE.
SPRING SCALE.
APPLICATION FILED FEB. 12, 1906.

WITNESSES:
F. C. Gibson.
L. B. Bridges.

INVENTOR
John H. Osborne,
BY Davis & Davis,
Attorneys.

UNITED STATES PATENT OFFICE.

JOHN H. OSBORNE, OF ANDERSON, INDIANA.

SPRING-SCALE.

No. 837,496.      Specification of Letters Patent.      Patented Dec. 4, 1906.

Application filed February 12, 1906. Serial No. 300,707.

*To all whom it may concern:*

Be it known that I, JOHN H. OSBORNE, a citizen of the United States of America, and a resident of Anderson, county of Madison, State of Indiana, have invented certain new and useful Improvements in Spring-Scales, of which the following is a full and clear specification; reference being had to the accompanying drawings, in which—

Figure 1:
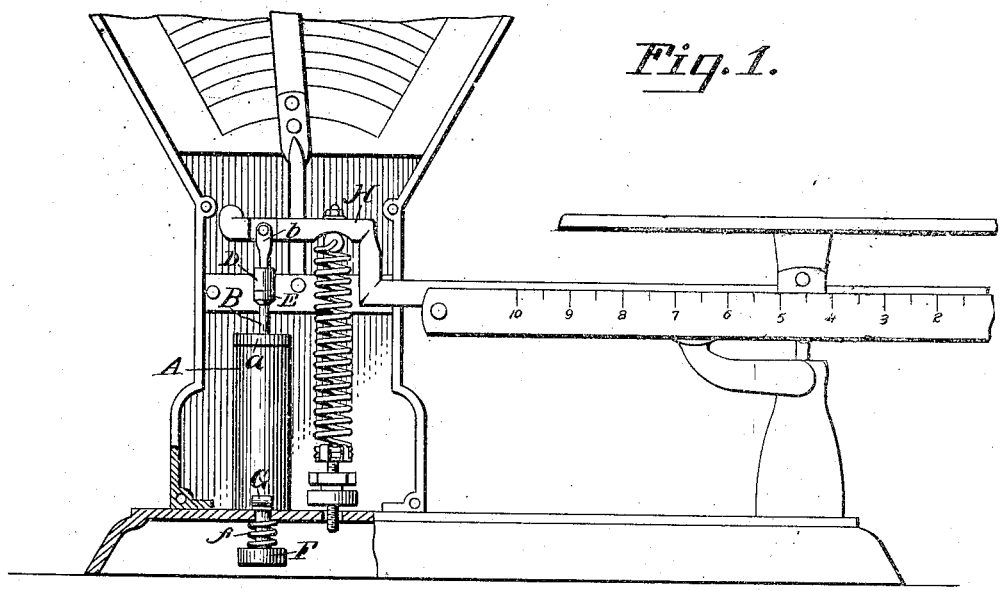
Figure 2:
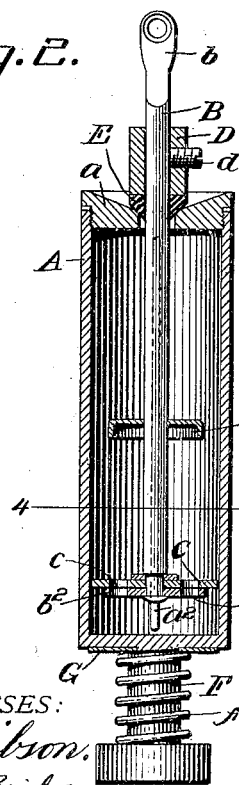
Figure 4:
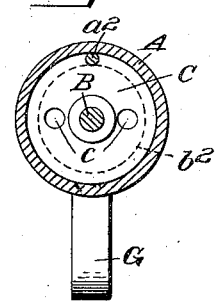
Figure 5:
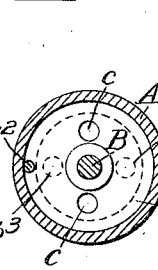
Figure 3:
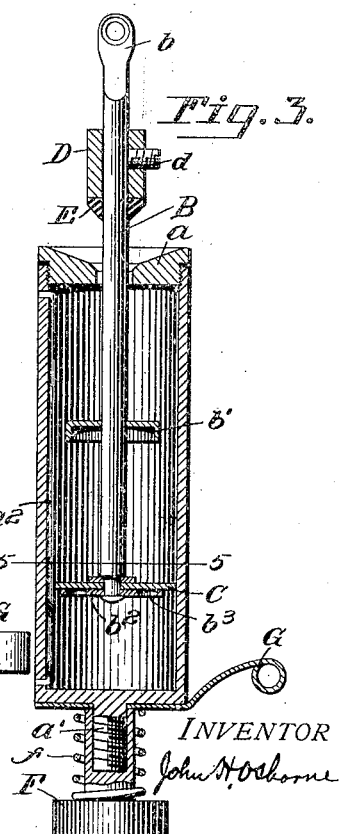

Figure 1 is a side elevation of a well-known type of computing-scale with the casing partly broken away to show my attachment; Fig. 2, a vertical sectional view of the attachment, showing the piston in its lowermost position; Fig. 3, a similar view showing the piston raised; Fig. 4, a transverse section on the line 4 4 of Fig. 2; Fig. 5, a transverse section on the line 5 5 of Fig. 3.

The object of this invention is to provide a simple attachment which will insure the pointer being quickly brought to rest, thereby preventing undesirable vibrations of the pointer, which prevent the quantity weighed being quickly read on the scale.

The device is especially adapted for computing-scales, as in that class of scales it is highly desirable that the long pointer or gage-arm be quickly and accurately brought to rest.

The invention has special relation to that type of arresters in which is employed a dash-pot or cup containing a liquid, such as oil, in which liquid dips a piston-like member or disk carried by a rod depending from a part of the scale-beam.

To the accomplishment of this object and such others as may hereinafter appear, the invention consists of the parts and combination of parts hereinafter fully described, and particularly pointed out in the appended claims, reference being had to the accompanying drawings, forming a part of this specification, in which the same reference characters designate like parts throughout the several views.

Referring to the drawings by reference characters, A designates the cylindrical cup containing a suitable quantity of oil, this cup having a closed bottom and a screw-plug closure at its upper end, this plug being provided with a central opening for the free passage of the vertically-reciprocating rod B, this rod having its upper end flattened at $b$, where it is pivotally but non-rotatably attached to the end H of the scale-beam.

The cylindrical cup is supported on the base of the scale in such manner as to be capable of axial rotation, the preferable way consisting of a screw $a'$, attached to the bottom of the cup and being screwed into the stem of a nut F, the flange or collar on the nut lying below the base of the scale and the stem serving as a pivot. To hold the cylinder firmly but not rigidly to the base, a coil-spring $f$ is interposed between the head of the nut F and the under side of the base-plate of the scale.

To rotate the cylinder, it may be provided with a short lever G at its lower end, or it may of course be provided with any other suitable device for convenience in adjusting it rotatably. The piston-like member on the lower end of the rod B consists of a disk C, rotatably mounted on the rod and fitting loosely in the cylinder. This disk is provided with two or more holes $c$, and it is notched at its edge to engage a rib $a^2$, running vertically on the interior of the cylinder, whereby when the cylinder is rotated this disk will rotate with it, while the rod will remain stationary. Another disk $b^2$ fits against the lower face of the disk C and is provided with holes $b^3$, which are adapted to be brought into register with the holes $c$ in the upper disk. This lower disk is affixed to the rod B and is therefore non-rotatable.

It will be observed from the above description that in order to regulate the device it is simply necessary to adjust the cylinder rotatively, as in that way the size of the openings through the disks may be determined. A convenient means for thus adjusting the size of the oil-passages through the piston member is highly desirable, as the action of the retarding-piston varies with different kinds of oil and different temperatures, as is obvious.

Upon the stem B at a point above the cylinder is adjustably secured, by means of a set-screw $d$, a collar D, to whose lower end is attached a beveled annular valve E of a suitable flexible material. This valve device is so adjusted on the stem that when the parts of the scale are in normal position the valve will be near to, but not against, a valve-seat formed around the central opening in the cap or plug $a$. The object of this valve is to prevent evaporation and leakage of the oil and also ingress of dirt during transportation and at other times while the scale is not in use. When it is desired to close the top of the dash-pot, the weight on the tare-beam may be moved forward far enough to hold the valve normally down against its seat, or, if necessary, the scale-beam may be fastened down in front, which is always done when the scales are shipped with oil in the dash-pot. This valve when adjusted close to the top of the dash-pot also acts as a stop or arrester when the weight is removed from the platform of the scale and the scale-beam is drawn suddenly down below the point of equilibrium by the spring. This causes the pointer to swing quickly to its normal position at zero and also to prevent the pointer swinging far enough beyond zero to strike the casing of the scale.

The letter $b'$ indicates a disk attached to the stem B and having its outer end flanged downwardly. This disk is for the purpose of preventing the oil from splashing through the opening in the top of the dash-pot, and it is so positioned on the stem that it is out of the oil when the stem is on the upward stroke.

It will be apparent to those skilled in the art that various mechanical embodiments of the invention are possible, and I therefore do not wish to be limited to the exact arrangement and construction shown.

What I claim, and desire to secure by Letters Patent, is—

1. In combination with a scale whose beam is normally drawn downward at its end, a dash-pot, a piston-rod extending into the dash-pot through its top, and a combined valve and arrester adjustable on the stem independently of the piston, substantially as and for the purpose set forth.

2. In combination with a scale, a depending rod non-rotatably attached to the scale-beam and provided with a piston at its lower end, said piston being composed of a rotatable and a non-rotatable member both of which are provided with registering apertures, and a rotatable cylindrical dash-pot provided with means for engaging the rotatable member of the piston, for the purposes set forth.

3. In combination with a scale, a non-rotatable rod depending from the beam thereof and carrying an apertured piston at its lower end, a rotatable cylindrical dash-pot inclosing the piston, and means whereby the rotation of the cylinder regulates the size of the passages through the piston.

4. In combination with a scale, a stem depending from its beam and carrying a dasher or piston at its lower end, an oil-cup in which the piston works and whose upper end is open for the passage of the stem, and a splasher-plate attached to the stem at a point above the piston, substantially as set forth.

5. In combination with a scale whose beam is normally held down, a stem depending from the beam, an axially-rotatable oil cup or cylinder in which the stem works, means for frictionally holding this cylinder against rotation, a piston on the stem, and means whereby the rotation of the cylinder varies the retarding action of the piston in the liquid contained in the cup or cylinder.

6. In combination with a scale, a rod depending from the beam thereof and carrying an apertured piston at its lower end, a rotatable cylindrical dash-pot inclosing the piston, and means whereby the rotation of the cylinder regulates the size of the passages through the piston.

7. In combination with a scale whose beam is normally held down, a stem depending from the beam, an axially-rotatable oil cup or cylinder in which the stem works, means for holding this cylinder against rotation, a piston on the stem, and means whereby the rotation of the cylinder varies the retarding action of the piston in the liquid contained in the cup or cylinder.

8. In combination with a scale embodying a beam, a stem depending from its beam, a dash-pot, means for normally drawing down the scale-beam, and a resilient buffer or arrester carried by the stem at a point just above the dash-pot whereby when the scale-beam rebounds below equilibrium the arrester will strike the dash-pot, substantially as and for the purpose set forth.

In testimony whereof I hereunto affix my signature, in the presence of two witnesses, this 1st day of February, 1906.

JOHN H. OSBORNE.

Witnesses:
 GLAD. S. KING,
 GUS. A. EITELMANN.